Nov. 2, 1965 J. ALBERANI 3,215,346
FORCE BALANCE SYSTEM
Filed April 1, 1963
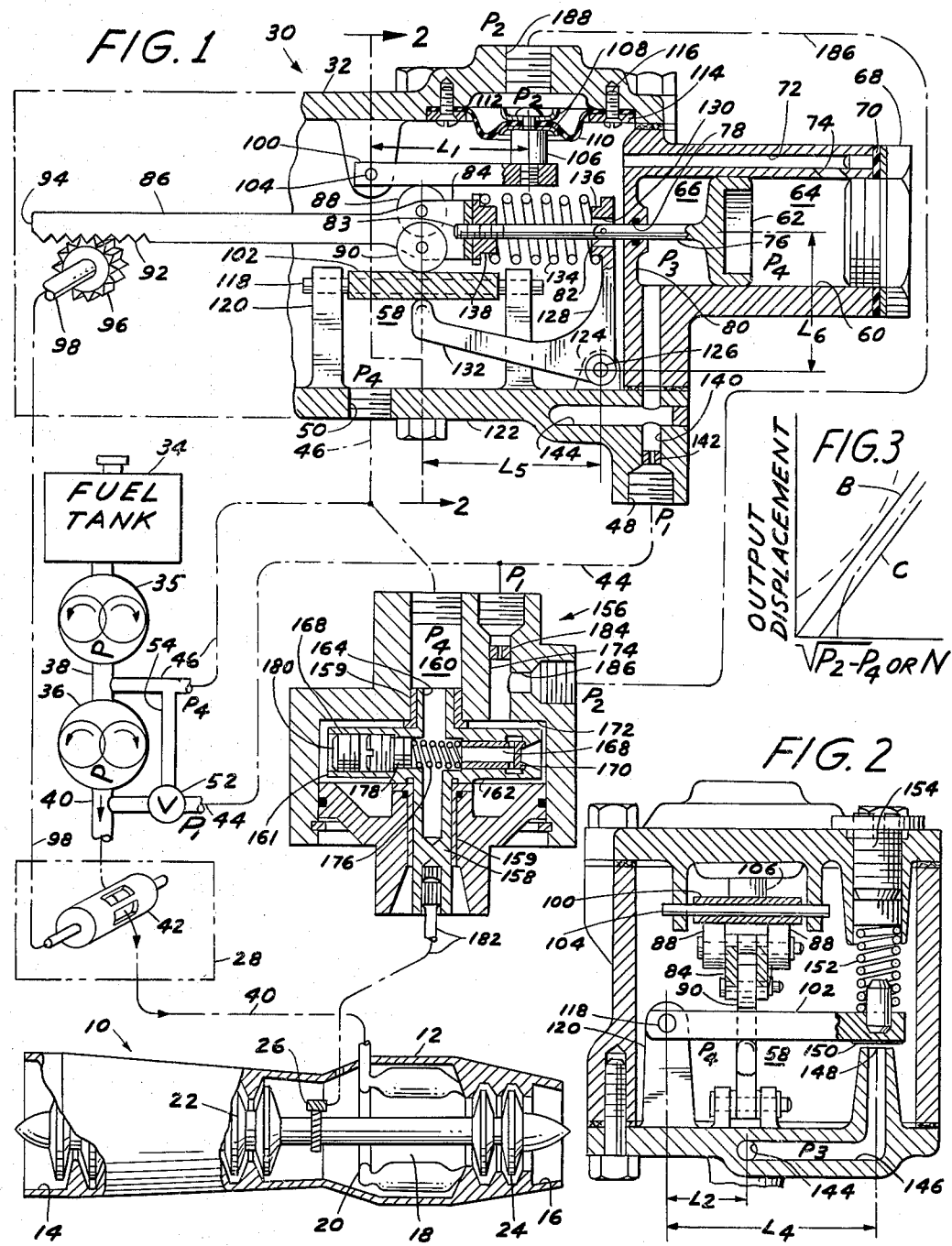
INVENTOR.
JULIUS ALBERANI
BY
Walter Potoroko, Jr.
ATTORNEY 3,215,346
FORCE BALANCE SYSTEM
Julius Alberani, Birmingham, Mich., assignor to Holley Carburetor Company, Warren, Mich., a corporation of Michigan
Filed Apr. 1, 1963, Ser. No. 269,551
6 Claims. (Cl. 235—200)

This invention relates generally to force balance systems, and more specifically to a system capable of producing an output displacement which is linear with respect to a sensed parameter from an input signal which varies as the square of the sensed parameter, without employing any feed-back or three dimensional cams.

One application for a force balance of this type is a fuel control for a gas turbine engine, wherein parameters of speed, temperature and pressure are used independently and/or collectively for determining and controlling the operation of the engine. Various hydraulic mechanisms have been designed that will sense the magnitudes of these parameters and react in an appropriate manner so as to compute or correct the fuel flow accordingly. However, these mechanisms, especially those concerned with the sensing of engine speed, have not proved to be entirely satisfactory. The objections thereto usually arise from the fact that the speed input sense varies as the square of the speed, while the control output should normally be linear with respect to speed.

The above inherent incompatibility necessitates the use of either complicated "feed back" cams and/or three dimensional cams or other devices which are extremely difficult to calibrate, the latter devices being known to lose their linear relationship over at least a portion of their operating ranges any time that a precise calibration is not maintained.

Accordingly, it is now proposed to provide a force balance system that will produce an output displacement which is linear with respect to a parameter such as speed from an input signal which varies as the square of the speed, without using any feed back cams or three dimensional cams, and that may be calibrated in a much easier manner than equivalent prior art devices.

Another object of the invention is to provide such a device which will maintain the linear relationship regardless of the number of adjustments which may be made.

Other more specific objectives and advantages of the invention will become apparent when reference is made to the following specification and accompanying illustrations wherein:

FIGURE 1 is a view, partially in fragmentary cross-section and partially in schematic form, illustrating the invention and its application to a gas turbine power plant;

FIGURE 2 is a cross-sectional view, taken on the plane of the line 2—2 of FIGURE 1 and looking in the direction of the arrows;

FIGURE 3 is a graph illustrating a result obtained by use of the invention with that generally obtained by use of prior art devices.

Referring to the drawings in greater detail, FIGURE 1 illustrates a gas turbine power plant 10 having an outer housing 12 with an intake 14 and an exhaust nozzle 16. A combustion chamber 18, having a fuel distribution ring 20 therein, is located within the housing 12 between the compressor 22 and the turbine 24. A gear box indicated generally at 26 may be provided in order to drive various engine accessories, such as certain components of the fuel control illustrated schematically at 28.

The hydro-mechanical computing device or force balance system 30 and the housing 32 surrounding it may, in reality, be considered an integral portion of the entire fuel control 28. The device 30 is shown in enlarged cross section for purposes of clarity; the fuel control 28, not forming any part of the invention, is illustrated schematically in order to show one possible use for the output of the device 30.

A gas turbine engine fuel supply system may be comprised generally of a fuel tank 34, a booster pump 35, a gear pump 36 and supply conduits 38 and 40, the latter delivering fuel to the main fuel control valve illustrated generally at 42. The control valve 42 then meters the correct fuel flow to the fuel distribution ring 20 for any particular engine operating requirement, as dictated by the various parameters, the present disclosure illustrating the positioning of the fuel control valve 42 with respect to the parameter of engine speed.

The high pressure conduit 44 branches off the supply conduit 40 while a low pressure conduit 46 braches off the supply conduit 38, the high and low pressure conduits 44 and 46 being in communication with the housing 32 at inlet ports 48 and 50, respectively. A branch conduit 54 communicates between the conduits 44 and 46. A regulator valve 52 is located in the conduit 44 at its junction with the branch conduit 54. The valve 52 serves to maintain a fixed relationship between pressures $P_1$ and $P_4$ in the conduits 44 and 46, respectively.

The housing 32 may comprise a central chamber 58 and a cylindrical chamber 60. The latter chamber 60 contains a piston 62 which in effect divides the chamber 60 into two distinct and variable chambers 64 and 66. Access to the chamber 60 for assembly purposes is possible through an opening normally containing a plug 68 and a seal 70. A conduit 72 and a port 74 communicates between the central chamber 58 and the variable chamber 64.

The piston 62 is provided with an extended portion 76 of reduced cross section which extends through a sealed opening 78 in the wall 80 between the chambers 66 and 58. The end 82 of the extended portion 76 may be pivotally connected to a rod whose other end 83 is threadedly attached to one end 84 of a member 86 having a set of upper and lower rollers 88 and 90 affixed substantially near the end thereof. The member 86 may include a rack 92 formed on its other end 94. The rack 92 cooperates with a gear 96 to move the main fuel control valve 42, as by a transmission line 98, whenever the piston 62 moves in response to some input signal, the input signal in this case being a speed sense.

The upper and lower rollers 88 and 90 are at all times in rolling contact with levers 100 and 102, respectively, as shown in FIGURES 1 and 2. The upper lever 100 is the acceleration fuel system lever of the fuel control 28. One end of the lever 100 is pivotally attached to the housing 32, as by a pivot pin 104, while the other end of the lever is fixedly attached to a stem 106 extending from a pair of diaphragm washers 108 having a diaphragm 110 clamped therebetween. The diaphragm 110 and a recess in the housing 32 form an additional chamber 112, and diaphragm 110 may be fastened to the housing 32 by means such as a clamping ring 114 and screws 116.

The lower lever 102 is mounted at one end thereof on a pivot pin 118 extending between a pair of bosses 120 formed on a wall 122 of the chamber 58. The lever 102 extends in a direction perpendicular to that of the acceleration fuel lever 100, as better illustrated in FIGURE 2.

An L-shaped lever 124 is pivotally connected to the housing 32, as by a pivot pin 126. One leg 128 of the lever 124 contains an opening 130 through which the extended portion 76 of the piston 62 extends, while the other leg 132 extends to a position beneath the lower lever 102. A spring 134 is confined between a seat 136 formed on the leg 128 and a second spring seat 138 which may be threadably attached to the end 82 of the extended portion 76 adjacent its point of connection with the end 84 of the member 86. Hence, the leg 132 of the lever 124 is continually urged against the under side of the lever 102 by virtue of the force of the spring 134 against the leg 128.

A conduit 140 including a fixed restriction 142 communicates between the inlet port 48 and the variable chamber 66. A conduit 144 branches off the conduit 140 to communicate with still another conduit 146 (FIGURE 2) whose outlet 148 into the chamber 58 forms a valve seat for a valving surface 150 formed on the free end of the lever 102. The valving surface 150 is urged toward the seat 148 by a spring 152 whose load may be manually adjusted by means of an adjustment screw 154 threadedly inserted into the housing 32.

A hydraulic speed sensing device may be employed to change a mechanical force into a hydraulic force. The basic speed sensing system may consist of a typical spinner unit 156 comprising a generally cylindrical member 158 being rotatably confined within bearings 159 in a chamber 160 and having radially extending arm portions 161 and 162 thereon. A concentric conduit 164 formed within the member 158 intersects the generally cylindrical cavity portions 166 and 168 formed within arms 161 and 162, respectively. A valve member 170 is mounted within the arm 162 so as to control fluid flow from a chamber 172, which surrounds the spinner assembly 156, to a conduit 174. A spring 176 may be employed to urge the valve 170 radially outwardly. A combination adjustable spring seat and sealed member 178 may be provided in the arm 161, in addition to an adjustably positioned weight 180. The weight is added so that the centrifugal force of the valve can be pivotally counteracted. The spinner assembly 156 is adapted to be rotated in accordance with engine speed, as by a flexible shaft 182 and any suitable driving means such as the gear box 26.

The conduit 174, including a restriction 184, communicates between the chamber 172 and the high pressure conduit 44. A conduit 186 branches off the conduit 174 at a point between the restriction 184 and the chamber 172 and leads to an inlet port 188 opening into the chamber 112.

*Operation*

For purposes of illustration, let it first be assumed that the engine 10 is running at some particular speed and that all of the elements of device 30 are in some equilibrium or steady state position. At this time, the differential pressure $P_3-P_4$ acting across the area of the piston 62 is equal and opposite to the force of the spring 134. Now as the engine 10 is accelerated, the gear box 26 rotates the flexible shaft, thereby causing the cylindrical member 158 of the spinner unit 156 to rotate at an increased rate. The effect of centrifugal force on valve 170 causes it to be moved outwardly, thereby restricting communication between chamber 172 and passages 168 and 164. This increases pressure $P_2$, and thus the pressure differential, $P_2-P_4$, the value of $P_4$ being controlled by the booster pump 35.

The increased pressure $P_2$, transmitted to the chamber 112 via the conduit 186, acts on the diaphragm 112 to move the connecting member 106 downwardly and the end of the lever 100 in a clockwise direction about the pivot pin 104, as observed in FIGURE 1. Movement of the lever 100 is transmitted directly to the lever 102 through the rollers 88 and 90 which are positioned between the two levers 100 and 102 so as to contact the oppositely disposed surfaces thereof. Therefore, the lever 102 is also rotated in a clockwise direction about its pivot pin 118. As observed in FIGURE 2, this moves the valving surface 150 toward the valve seat 148, thereby reducing the opening from the passage 146 into the chamber 58.

The fluid in the passage 146 is under a pressure $P_3$ resulting from fluid under pressure $P_1$ from the regulator valve 52 having flowed from the conduit 44 to the passages 140 and 146 via the restriction 142. As observed in FIGURE 1, fluid under pressure $P_3$ is also present in the chamber 66 by the way of the passage 140.

As the opening between the valving surface 150 and the seat 118 decreases, the pressure $P_3$ increases. Hence, the pressure differential $P_3-P_4$ acting across the area of the piston 62 is now greater than the opposing force of the springs 134. This unbalanced force moves the piston 62 to the right. Since the member 86 is attached to the extended portion 76 of the piston 62, the rollers 88 and 90 are moved to the right, increasing the distance "X" of the rollers from the pivot pin 104. Also, since the spring 134 is being compressed by this movement to the right, its force on the leg 128 of the lever 124 is increased. This, of course, pivots the other leg 132 upwardly against the underside of the lever 102, causing the latter to be pivoted in a counterclockwise direction about its pivot pin 118, once again opening the valve 148/150 and thereby decreasing the pressure differential $P_3-P_4$. At some proper distance "X," the pressure differential $P_3-P_4$ will again equal the opposing force of the loaded spring 134, at which time, the load of the spring 134 against the leg 128 is such that the moments on the levers 100 and 102 are in balance.

The travel "X" of the rollers is directly proportional to the speed, rather than to speed squared, as may be observed from the following moment balance equations wherein the input signal to the mechanical computing device 30 from the speed sense 156 is the pressure differential, $P_2-P_4$, as indicated above and wherein:

Area of the diaphragm 110 _____ $A_1$
Area of the valve seat 148 _____ $A_2$
Area of the piston 62 _____ $A_3$
Load of spring 134 _____ $F_1$
Initial load of spring 134 _____ $F_2$
Rate of spring 134 _____ $K_1$
Load of spring 152 _____ $F_3$
Force on the rollers 88 and 90 _____ $F_4$
Distance of the rollers 88 and 90 from the pivot pin 104 _____ X
Speed in r.p.m. _____ N The moment balance equation on the lever 100 about the pivot pin 104 is:

$$(P_2-P_4)A_1L_1 = F_4X, \quad F_4 = \frac{(P_2-P_4)A_1L_1}{X}$$

The moment balance equation on the lever 102 about the pivot pin 118 is:

$$F_4L_2 = F_1\frac{L_6}{L_5}L_2 + (P_3-P_4)A_2L_4 - F_3L_4$$

or:

$$F_4 = \frac{F_1\frac{L_6}{L_5}L_2 + (P_3-P_4)A_2L_4 - F_3L_4}{L_2}$$

Since $F_4$ is common to both levers:

$$(P_2-P_4)A_1L_1L_2 = \left[F_1\frac{L_6}{L_5}L_2 + (P_3-P_4)A_2L_4 - F_3L_4\right]X$$

and since:

$$F_1 = F_2 + XK_1, \quad P_3-P_4 = \frac{F_2+XK_1}{A_3}$$

Then:

$$(P_2-P_4)A_1L_1L_2 = \left[F_2\frac{L_6}{L_5}L_2 + XK_1\frac{L_6}{L_5}L_2 + \frac{F_2}{A_3}A_2L_4 + \frac{XK_1}{A_3}A_2L_4 - F_3L_4\right]X$$

If the design selected is such that $$F_3L_4 = F_2\frac{L_6}{L_5}L_2 + \frac{F_2}{A_3}A_2L_4$$

these terms cancel each other in the equation, leaving:

$$(P_2-P_4)A_1L_1L_2 = \left[XK_1\frac{L_6}{L_5}L_2 + \frac{XK_1A_2L_4}{A_3}\right]X$$

Therefore:

$$(P_2-P_4)A_1L_1 = X^2K_1\left[\frac{L_6}{L_5} + \frac{A_2L_4}{A_3L_2}\right]$$

Transposing:

$$X_2 = \frac{(P_2-P_4)A_1L_1}{K_1\left[\frac{L_6}{L_5} + \frac{A_2L_4}{A_3L_2}\right]}$$

Since $A_1$, $L_1$, $K_1$, $L_6$, $L_5$, $A_2$, $A_3$, $L_4$ and $L_2$ are constant, it can be said:

$$X^2 = \frac{1}{K_1}(P_2-P_4), \quad X = \sqrt{\frac{1}{K_1}(P_2-P_4)}, \quad X = K_2\sqrt{P_2-P_4}$$

Since $P_2-P_4$ is a hydraulic speed sense signal proportional to the speed squared:

$$P_2-P_4 = K_3N^2, \quad \sqrt{P_2-P_4} = K_4N$$

Then it may be concluded that:

$$X = K_2K_4N = K_5N$$

In other words, the travel "X" of the rollers 88 and 90 is directly proportional to speed "N."

The practical effect of the above in the fuel control application shown is that the rack 92 formed on the member 86 rotates the gear 96. This, in turn, repositions the fuel control valve 42 through the transmission line 98 so as to lineally meter the correct fuel flow to distribution ring 20, as required for the increased speed of the engine.

It is, of course, understood that, should the engine decelerate, the reverse of hte above operation would occur to once again bring the elements of the device 30 into equilibrium, thereby constantly providing the engine with the desired amount of fuel.

If it were desired, a mechanical speed sensing device could be used in lieu of the hydraulic speed sensing mechanism 156. This would eliminate the variable hydraulic pressure $P_2$ from being applied against the diaphragm 110 in the chamber 112. Instead, a member, responsive to the movement of conventional flyweights, would abut either against the outer diaphragm washer 108 and directly move the stem 106 which is connected to the lever 100, or directly against the lever 100 through a suitable seal in the wall of the housing 32, the seal having replaced the diaphragm 110 and the stem 106. An increase in speed would cause the well-known flyweights to pivot outwardly, thereby moving the above mentioned member and, hence, the lever 100, downwardly, as observed in FIGURE 1. The result then would be the same whether a mechanical speed sensing unit or the hydraulic speed sensing unit illustrated in FIGURE 1 were used.

In prior mechanical computing devices purporting to produce an output displacement which is linear with respect to the square root of the magnitude of the force input, the linear relationship has been extremely difficult to maintain. In some cases springs must be tediously selected because an exact "zero" spring force must exist only at that point where the moment arm is also "zero." Since this is normally a virtual impossibility, a curve approaching the dash line, rather than the desired straight solid line curve B, of FIGURE 3 usually results.

In still other prior art devices, adjustments may be made by shimming. This results in the straight line curve being distorted at its lower end, as in the case of the dot-dash curve of FIGURE 3. In other words, unless an exact O—O point can be maintained in the prior devices between the output displacement and the speed (see FIGURE 3), the desired linear relationship becomes distorted over all or a portion of the operational range.

In a device embodying the invention, adjustment of the load on the spring 152 (FIGURE 2) may be simply and readily made by means of the adjustment screw 154. As a result, the slope of the curve is not affected, and the solid line curve B of FIGURE 3 is merely moved to the right or left from the O—O interception point, as indicated by curve C which remains parallel to curve B. Thus, the initial O—O relationship required in prior art devices in not necessary in a device embodying the invention, because calibration of the device is a quick and simple process.

Although but one embodiment of the invention has been disclosed and described, it is apparent that other modifications of the invention may be possible within the scope of the appended claims.

What I claim as my invention is:

1. A computing device comprising first and second chambers, said second chamber being divided into first and second variable chambers by means of a piston, a first conduit communicating between said first chamber and said first variable chamber, a second conduit communicating between said first chamber and said second variable chamber, first and second moment arms pivotally supported in said first chamber, said moment arms being diposed at right angles to one another, a source of fuel under pressure, means for supplying said fuel at two different pressures from said source to said first chamber and said second variable chamber, a valve for maintaining said two different pressures directly proportional to one another, said lower pressure being supplied to said first chamber, said higher pressure being supplied through a restriction to said second conduit, said second moment arm forming a variable opening with the outlet of said second conduit into said first chamber, a first spring in said first chamber for urging said second moment arm toward said outlet, manual means for adjusting the load on said first spring, roller means connected through the wall between said first chamber and said second variable chamber to said piston, said roller means being in contact with adjacent sides of said first and second moment arms, a lever pivotally located in said first chamber, said lever having one leg thereof urging said second moment arm away from said outlet and the other leg thereof being urged by a second spring away from said roller means, and a force input means for pivotally influencing said first moment arm.

2. A computing device comprising first, second and third chambers, said second and third chambers being variable in size but having a constant total volume, a first conduitry system communicating between said first chamber and said second chamber, a second conduitry system communicating between said first chamber and said third chamber, a first source of low pressure for said first chamber, a second source of high pressure for said second conduitry system, valve means for maintaining said low pressure and said high pressure in direct proportion to one another, a fixed restriction located between said second source and said second conduitry system, a first moment arm pivotally supported in said first chamber, the free end of said first moment arm forming a variable opening with the outlet of said second conduitry system, a second moment arm pivotally supported in said first chamber above and at substantially right angles with said first moment arm, a roller mechanism confined between said first moment arm and said second moment arm for at times rolling laterally across said first moment arm and longitudinally across said second moment arm, a piston forming a movable wall between said second chamber and said third chamber, an extension from said piston through the wall between said first chamber and said third chamber, said extension being pivotally attached to said roller means, a substantially L-shaped lever pivotally located in said first chamber, said lever including a first leg having a hole therethrough for surrounding said extension and a second leg for urging said first moment arm away from said outlet, a first resilient means for urging said first moment arm toward said outlet, a second resilient means confined between said roller means and said first leg around said extension, and a force input means for providing a force against said second moment arm on the side opposite to said roller means.

3. A computing device comprising a first chamber containing a pressure $P_4$ and including a pair of levers positioned apart from and at right angles to each other, a pair of rollers contacting opposing sides of said pair of levers, a piston located in a second chamber for moving said set of rollers in response to a differential pressure $P_3-P_4$, a third chamber containing a pressure $P_2$, a device responsive to the differential pressure $P_2-P_4$, said device forming a movable wall between said first and said third chambers, a connecting link between said pressure responsive device and one of said pair of levers for pivoting said lever in accordance with the movement of said pressure responsive device, a substantially L-shaped lever having one leg thereof abutting against the second of said pair of levers on the side opposite to the side contacted by the rollers, the other leg being resiliently urged by said piston in a direction which forces said first leg to pivot the second lever in the direction of said second lever in response to changes in the differential pressure $P_3-P_4$, a conduit communicating between said first and second chambers, a valve formed by said second lever with the outlet of said conduit into said first chamber, and a manually adjustable resilient means for urging said second lever toward said outlet into said first chamber.

4. A computing device comprising a source of pressure for supplying two pressures directly proportional to one another, upper and lower moment balance arms, a movable member, means movingly confined between said arms and operatively connected to said movable member for creating an output movement of said movable member, force input means for moving said upper moment arm, said output movement being of a magnitude proportional to the square root of the magnitude of said force input, means associated with said lower moment balance arm for varying the higher of said two pressures in response to movement of said lower moment balance arm, and additional means for moving said first mentioned means in response to the differential pressure between the lower of said two pressures and said variable higher pressure.

5. A computing device comprising a source of pressure for supplying two pressures directly proportional to one another, upper and lower moment balance arms, a movable member, roller means movingly confined between said arms and operatively connected to said movable member for creating an output movement of said movable member, force input means for moving said upper moment arm, said output movement being of a magnitude proportional to the square root of the magnitude of said force input, valve means associated with said lower moment balance arm for varying the higher of said two pressures in response to movement of said lower moment balance arm, and additional means for moving said first mentioned roller means in response to the differential pressure between the lower of said two pressures and said variable higher pressure.

6. A computing device comprising a source of low pressure and a source of variable higher pressure, upper and lower moment balance arms, a movable member, means movingly confined between said arms and operatively connected to said movable member for creating an output movement, said means moving in response to the differential pressure between said low and said variable higher pressures, and independent force input means for moving said upper moment arm, said output movement being of a magnitude proportional to the square root of the magnitude of said force input.

References Cited by the Examiner
UNITED STATES PATENTS

| | | | |
|---|---|---|---|
| 2,487,310 | 11/49 | Chandler | 235—61 |
| 2,918,214 | 12/59 | Sorteberg | 235—61 |
| 2,968,283 | 1/61 | Hilker | 91—47 |
| 2,980,069 | 4/61 | Hilker | 235—61 |

LEO SMILOW, *Primary Examiner.*